June 9, 1936.  C. E. HOOVER  2,043,512
SOLDERLESS BATTERY CABLE GRIP
Filed Nov. 2, 1934
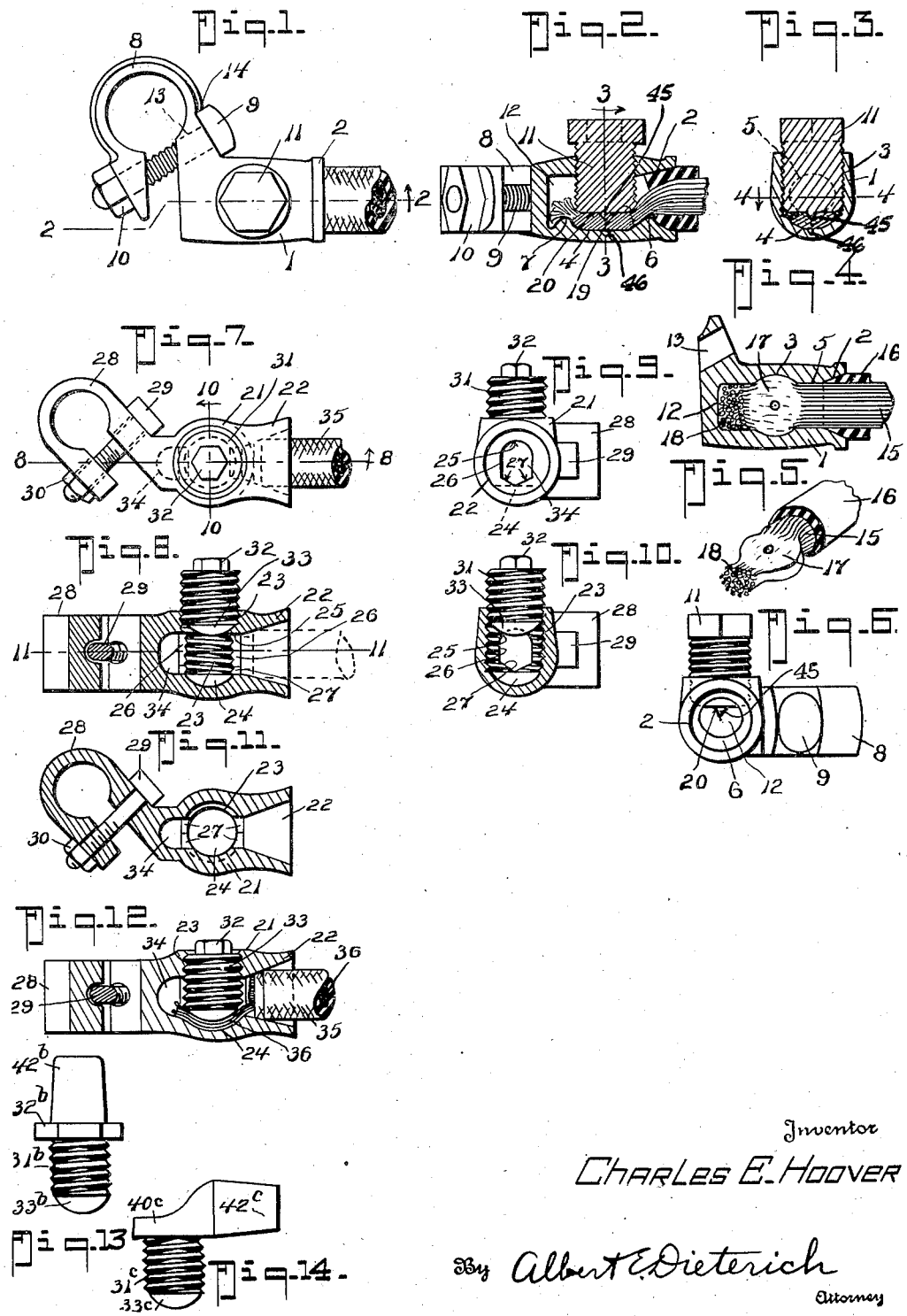
Inventor
Charles E. Hoover
By Albert E. Dieterich
Attorney Patented June 9, 1936

2,043,512

UNITED STATES PATENT OFFICE 2,043,512

SOLDERLESS BATTERY CABLE GRIP

Charles E. Hoover, Lancaster, Pa.

Application November 2, 1934, Serial No. 751,231

6 Claims. (Cl. 173—269)

My invention relates to means for connecting battery cables to terminals for use with storage batteries and it has for an object to provide a means whereby the cable, even though most of its strands shall have been broken off, may be securely held, in an acid-proof way, to the terminal.

An object of the invention is to provide means securely to lock a cable end in a battery terminal sleeve or socket.

Further, it is an object to provide a means to receive a cable end, which means is so constructed that it will have an acid-proof pocket in which the wire strands are held, the entrance to the pocket being closed by the insulation of the cable.

Further, it is an object to provide a solderless battery cable grip terminal which is protected against corrosion either by creeping acid or by acid fumes entering the cable socket thereof.

Further, it is an object to provide a solderless cable grip having a straight sided standard or S. A. E. threaded plug to fit a threaded hole in the body which has the recess for the cable ends, the plug having a nut head of smaller diameter to allow the plug to be screwed in and accommodate any desired grip according to the number of strands or size of the cable.

A further object is to provide a solderless battery cable grip terminal which will interlock with the cable regardless of whether or not it be of few or many strands.

Further, it is an object to provide a battery cable grip using a screw plug to which other cable terminals may be anchored.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a plan view of one embodiment of my invention.

Figure 2 is a vertical longitudinal section on the line 2—2 of Figure 1.

Figure 3 is a vertical cross section on the line 3—3 of Figure 2.

Figure 4 is a detail horizontal section on the line 4—4 of Figure 3.

Figure 5 is a detail perspective view showing a cable end as it appears after having been secured in the cable grip socket.

Figure 6 is an end elevation of the embodiment shown in Figure 1.

Figure 7 is a plan view of another embodiment of my invention.

Figure 8 is a vertical section on the line 8—8 of Figure 7.

Figure 9 is an end elevation of the parts shown in Figure 7.

Figure 10 is a vertical cross section on the line 10—10 of Figure 7.

Figure 11 is a horizontal section on the line 11—11 of Figure 8.

Figure 12 is a view similar to Figure 8 showing how a cable having but a few available strands may be secured.

Figure 13 is an elevation of a modified form of plug.

Figure 14 is an elevation of another modified form of plug.

In the accompanying drawing, in which like numerals of reference indicate like parts in all the figures, 1 represents the body or socket portion of the cable terminal which has a flared entrance end 2 and a threaded plug receiving hole 3, together with a concave seat 4 below the hole 3. The entrant end of the socket is restricted at 5 to a diameter substantially smaller than that of the threaded bore 3, by means of a transverse rib-like portion or half moon 6. The rear or innermost end 12 of the socket is similarly restricted adjacent the bore 3 by a half moon rib 7.

8 designates the usual split clamp which may be secured to a battery post by a bolt 9, passing through a hole 13, and a nut 10, a shoulder 14 being provided to hold the bolt from turning.

The screw plug 11 which cooperates with the aforesaid structure embodies a straight side threaded plug having a substantially flat end 20 with rounded corners 19.

The battery cable is designated in Figures 1 to 6 by the numbers 15 to 18 inclusive, 15 being the normal round pack of wire strands which are covered with insulation 16, while 17 designates the portion formed by the action of the clamp screw 11; the top surface of this portion 17 is approximately flat, while the under side is convex. (See Figures 2, 3 and 5.) 18 designates the loose ends of the cable wires spread in the chamber 12 when screw 11 is screwed down. By inserting the strands 15 through the restricted passage 5, past the bore 3 into the chamber 12 with the insulation pressed tightly into the flared end 2, when screw 11 is tightened down it will draw in the cable and cause the insulation 16 to be drawn tightly into the socket; the screw will deflect downwardly and laterally the strands 5 beneath the screw and mash and compact the strands together into a substantially solid mass 17, allowing the ends 18 to spread out freely. Thus, even should the screw 11 work loose, which is quite unlikely, the formation of the solidified "button" 17 will prevent the cable being pulled out of the socket.

In order to insure a full spreading out of the wires to form the button 17 I may provide the screw plug 11e with a conical point or teat 45 (see Figures 2, 3 and 6) to project into the cable and spread the strands radially from the center or axis of the plug. The socket 1e may be provided with a corresponding recess 46 into which the point 45 may project when the screw plug is all the way in.

In Figures 7 to 12 inclusive is shown another embodiment of my invention, by reference to which it will be seen that 21 represents the body of the cable terminal, which body has a flared entrance portion or bell mouth 22 and a threaded plug receiving hole 23, the latter being of greater diameter than the width of the wire receiving socket which is composed of the parts 25, 26, 27 and 34, and which intersects the hole 23 at right angles. The bottom of the threaded hole is concaved as at 24 and lies at a lower level than the bottom 27 of the wire socket (see Figure 10) to constitute a seat.

28 is the usual split clamp which may be secured to a battery post by a bolt 29 and nut 30 in the usual manner.

The screw plug 31 which cooperates with the aforesaid structure embodies a straight side threaded plug having a smooth surfaced convexed end 33 to cooperate with the concaved seat 24 (see Figure 12). The other end of the plug 31 has a nut-head 32, preferably of lesser diameter than that of the plug as a whole, to receive a wrench for turning.

The battery cable is designated in Figures 7 to 12 by the numeral 35 and its strands by the numeral 36.

That portion of the wire receiving socket which is intersected by the threaded bore 23 has vertical side walls 26, an arched top 25, and a V-shaped bottom 27. The pocket 34 at the inner end of the socket is for the reception of the ends of the wire strands 36 when they are spread or squeezed by the clamping action of the plug through the medium of the concaved convexed surfaces 24 and 33 respectively, see Figure 12.

If it be desired to hitch a split clamp type connector to my terminal a terminal such as 42b or 42c of the battery post type may be formed on the plug or screw as shown in Figures 13 and 14.

Those parts in Figure 13 which correspond to Figures 7 to 12, inclusive, bear the same reference numerals plus the index letter b and those parts in Figure 14 which correspond to similar parts in Figures 7 to 12, inclusive, bear the same reference numerals plus the index letter c, so further and detailed description thereof is thought to be unnesessary.

When the cable is inserted into the socket as shown in Figure 7, or dotted lines in Figure 8, it is pushed in tightly so that the insulation of the cable will be wedged into the bell mouth 22 and thus form an acid-tight plug or stopper. The plug 21 is then screwed down tightly and causes the strands of the cable to spread laterally as well as to be compacted by the screw action. This flattens out the stranded cable near the end. Regardless of whether or not all of the strands are available for clamping purposes the clamp will securely grip any strands located between the concavity 24 and the convexity 33.

By making the strand-receiving bore of straight sides 26 and of a width less than the diameter of the threaded bore 23, see Figure 10, the cable strands may be pushed in without tangling up with the threads during the insertion process. Furthermore, the V-shaped bottom 27—27 allows the strands to center in the strand-receiving socket regardless of the number of strands or the size of the cable being secured. Furthermore, the provision of the V-shaped bottom wall 27 close to the bore 23 enables the screw plug to be screwed down to its desired depth to grip any number of cable strands completely and close the entrance to the socket by constriction of the V-shaped entrance.

The chamber 34 provides a convenient place to allow the ends of the cable strands to project into over the V-shaped bottom and allow the plug to be screwed down on the cable strands and force any number of strands, regardless of the number, into the seat of the pocket and grip the strands fully while at the same time closing the pocket at both the front and rear by constriction of the seat in the sleeve pocket and threaded top and side walls of the pocket and bore 23.

The thickness of the material of the body 21 between the wire receiving recess and the outer or top surface is sufficient in the depth of the material so that the screw plug 31 can be run all the way down to the bottom without becoming unthreaded from a complete circle of threads and thus no opening is left around the top of the plug through which acid or acid fumes may pass into the wire receiving recess or pocket. Furthermore, by running the threads 23 all the way down to the concavity 24 the screw plug 31 will have an adequate bearing and all of the strain will not be taken up by the few threads at the top of the body 21.

As to all subject matter in common between this application and my application filed June 8, 1933, Serial No. 674,956 (on a portion of which application Letters Patent #2,015,144 was issued September 24, 1935), my present application is a continuation in part of said application, Serial No. 674,956; it being the intention that the present application shall carry the broad or generic claims to all species and the specific claims to the species shown in Figures 1–12 inclusive, of this application, while Patent #2,015,144 carries the claims to the species therein shown and described.

From the foregoing description, taken in connection with the accompanying drawing, it is thought that the complete construction, operation and advantages of my invention will be clear to those skilled in the art, and I wish it understood that further changes in the details of construction and arrangement of parts than those illustrated may be made without departing from the spirit of the invention or the scope of the appended claims.

What I claim is:

1. A battery cable terminal comprising a part to fit a battery post and a wire receiving socket, said socket having a longitudinal chamber of a diameter sufficient only to receive the strands of a stranded-wire insulated cable, the entrance of said chamber being outwardly flared to a diameter sufficient to receive the insulated part of the cable, said socket having a threaded bore of substantially greater diameter than that of said longitudinal chamber, the axis of said threaded bore being normal to that of said longitudinal chamber, said socket having a depression in its wall opposite the threaded bore and a solid end wall screw plug fitting said threaded bore to cooperate with said depression in clamping the wire strands in said longitudinal chamber and drawing the cable's insulation into fluid-tight contact with the wall of said flared entrance.

2. A battery cable terminal comprising a part to fit a battery post and a wire receiving socket, said socket having a longitudinal chamber of a diameter sufficient only to receive the strands of a stranded-wire insulated cable, the entrance of said chamber being outwardly flared to a diameter sufficient to receive the insulated part of the cable, said socket having a threaded bore of substantially greater diameter than that of said longitudinal chamber, the axis of said threaded bore being normal to that of said longitudinal chamber, said socket having a depression in its wall opposite the threaded bore, a solid-end screw plug fitting said threaded bore to cooperate in clamping the wire strands with said depression in clamping the wire strands in said longitudinal chamber and drawing the cable's insulation into fluid-tight contact with the wall of said flared entrance, said socket having at least one half-moon rib transversely located in said longitudinal chamber adjacent said depression over which rib the strands of the cable are bent when the screw is tightened down.

3. A battery cable terminal comprising a part to fit a battery post and a wire receiving socket, said socket having a longitudinal chamber of a diameter sufficient only to receive the strands of a stranded-wire insulated cable, the entrance of said chamber being outwardly flared to a diameter sufficient to receive the insulated part of the cable, said socket having a threaded bore of substantially greater diameter than that of said longitudinal chamber, the axis of said threaded bore being normal to that of said longitudinal chamber, said socket having a depression in its wall opposite the threaded bore, and a solid-end screw plug fitting said threaded bore to cooperate with said depression in clamping the wire strands in said longitudinal chamber and drawing the cable's insulation into fluid-tight contact with the wall of said flared entrance, said screw having an approximately flat clamping end and having a pin projecting from its flattened end to penetrate between the wires of the strand of cable and spread the strands laterally as the flat end of the screw compresses the strands into the depression.

4. A battery cable terminal comprising a part to fit a battery post and a wire receiving socket, said socket having a longitudinal chamber of a diameter sufficient only to receive the strands of a stranded-wire insulated cable, the entrance of said chamber being outwardly flared to a diameter sufficient to receive the insulated part of the cable, said socket having a threaded bore of substantially greater diameter than that of said longitudinal chamber, the axis of said threaded bore being normal to that of said longitudinal chamber, said socket having a depression in its wall opposite the threaded bore, a solid-end screw plug fitting said threaded bore to cooperate with said depression in clamping the wire strands in said longitudinal chamber and drawing the cable's insulation into fluid-tight contact with the wall of said flared entrance, said socket having at least one half-moon rib transversely located in said longitudinal chamber adjacent said depression over which rib the strands of the cable are bent when the screw is tightened down, and said screw having an approximately flat clamping end and having a pin projecting from its flattened end to penetrate between the wires of the strand of cable and spread the strands laterally as the flat end of the screw compresses the strands into the depression.

5. A battery cable terminal comprising a part to engage a battery post and a part having a wire receiving socket which has a longitudinal chamber of a diameter sufficient only to receive the wires of an insulated cable, the entrance of said chamber being outwardly flared to a diameter sufficient to receive the insulated part of the cable, said socket having a threaded bore of substantially greater diameter than that of said longitudinal chamber, the axis of said bore being normal to that of said longitudinal chamber, said socket having two ribs transversely located in said longitudinal chamber adjacent the bottom of said threaded bore one at each side of the threaded bore, a solid-end screw plug fitting said threaded bore to clamp the wires in the socket between said ribs and to draw the cable's insulation into fluid-tight contact with the wall of said flared entrance.

6. A battery cable terminal comprising a part to engage a battery post and a part having a wire receiving socket which has a longitudinal chamber of a diameter sufficient only to receive the wires of an insulated cable, the entrance of said chamber being outwardly flared to a diameter sufficient to receive the insulated part of the cable, said socket having a flared bore of substantially greater diameter than that of said longitudinal chamber, the axis of said bore being normal to that of said longitudinal chamber, said socket having two ribs transversely located in said longitudinal chamber adjacent the bottom of said threaded bore one at each side of the threaded bore, a solid-end screw plug fitting said threaded bore to clamp the wires in the socket between said ribs and to draw the cable's insulation into fluid-tight contact with the wall of said flared entrance, said screw having a pin projecting from its solid-end to penetrate the wires of the cable and spread the same laterally as said end of said screw compresses the wires into the depression.

CHARLES E. HOOVER.